(12) United States Patent
Payne et al.

(10) Patent No.: US 6,894,751 B2
(45) Date of Patent: May 17, 2005

(54) PROCESS FOR MAKING AN OPTICAL COMPENSATOR FILM COMPRISING AN ANISOTROPIC NEMATIC LIQUID CRYSTAL

(75) Inventors: Jason A. Payne, Rochester, NY (US); Joseph W. Hoff, Fairport, NY (US); Richard A. Castle, Webster, NY (US); Charles L. Bauer, Webster, NY (US); James F. Elman, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 163 days.

(21) Appl. No.: 10/194,823

(22) Filed: Jul. 12, 2002

(65) Prior Publication Data

US 2004/0008305 A1 Jan. 15, 2004

(51) Int. Cl.[7] .................. G02F 1/1335; B05D 5/06; C08F 2/48
(52) U.S. Cl. .................. 349/117; 427/164; 427/508
(58) Field of Search .................. 349/117; 427/164, 427/508

(56) References Cited

U.S. PATENT DOCUMENTS

| | | | | |
|---|---|---|---|---|
| 5,518,783 A | * | 5/1996 | Kawata et al. ............ | 428/1.1 |
| 5,619,352 A | * | 4/1997 | Koch et al. .............. | 349/89 |
| 5,853,801 A | * | 12/1998 | Suga et al. ............. | 427/164 |
| 6,025,900 A | * | 2/2000 | Yoon et al. ............. | 349/124 |
| 6,034,754 A | * | 3/2000 | Sato et al. ............. | 349/102 |
| 6,160,597 A | | 12/2000 | Schadt et al. | |
| 6,476,892 B2 | * | 11/2002 | Aminaka .............. | 349/117 |
| 2003/0067572 A1 | * | 4/2003 | Umeda et al. .......... | 349/117 |

FOREIGN PATENT DOCUMENTS

| | | |
|---|---|---|
| EP | 0 646 829 | 7/2002 |
| JP | 2002/122741 | 4/2002 |

* cited by examiner

*Primary Examiner*—Robert H. Kim
*Assistant Examiner*—Jeanne Andrea Di Grazio
(74) *Attorney, Agent, or Firm*—Arthur E. Kluegel

(57) ABSTRACT

A process for making an optical compensator, comprising the steps of coating a orientable resin in a solvent onto a support; drying the resin-containing coating; orienting the resin-containing layer in a predetermined direction; coating a nematic liquid-crystal compound in a solvent carrier onto the orientation layer; drying the nematic liquid-crystal-containing coating; thermally treating the nematic liquid-crystal compound layer, cooling the nematic liquid-crystal compound layer, polymerizing or curing the anisotropic nematic liquid-crystalline layer to form an integral component; and optionally repeating the above steps on top of the integral component so that the optical axis of the first anisotropic nematic liquid-crystal layer is positioned orthogonally relative to the respective optical axis of the second anisotropic nematic liquid-crystal layer about an axis perpendicular to the plane of the support.

31 Claims, 9 Drawing Sheets

PROCESS FOR MAKING AN OPTICAL COMPENSATOR FILM COMPRISING AN ANISOTROPIC NEMATIC LIQUID CRYSTAL

CROSS-REFERENCE TO RELATED APPLICATIONS

This application is cofiled as part of a group of the following commonly assigned applications under Ser. Nos. 10/194,162, 10/195,093, 10/195,094, 10/194,097, 10/194,750 and Ser. No. 10/194,130, the contents of which are incorporated herein by reference.

FIELD OF THE INVENTION

This invention relates to a method for making an optical compensator for improving viewing-angle characteristics of liquid crystal displays.

BACKGROUND OF THE INVENTION

Current rapid expansion in the use of liquid crystal displays (LCDs), in various areas of information display, is largely due to improvements of display qualities. Contrast, color reproduction, and stable gray scale intensities are important display qualities for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about normal incidence to the display and falls off rapidly as the viewing angle is increased. In color displays, the leakage problem not only degrades the contrast, but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

Thus, one of the major considerations for evaluating the quality of such displays is the viewing-angle characteristics, which describes a change in contrast ratio from different viewing angles. It is desirable to be able to see the same image from a wide variation in viewing angles and this ability has been a shortcoming with liquid crystal display devices. One way to improve the viewing-angle characteristics is to insert an optical compensator (also referred to as a compensation film, retardation film, or retarder) situated between the polarizer and liquid crystal cell. An optical compensator can widen the viewing-angle characteristics of liquid crystal displays, and in particular of Twisted Nematic (TN), Super Twisted Nematic (STN), Optically Compensated Bend (OCB), In Plane Switching (IPS), or Vertically Aligned (VA) liquid crystal displays. These various liquid crystal display technologies have been reviewed in U.S. Pat. No. 5,619,352 (Koch et al.), U.S. Pat. No. 5,410,422 (Bos), and U.S. Pat. No. 4,701,028 (Clerc et al.).

Optical compensators are disclosed in U.S. Pat. No. 5,583,679 (Ito et al.), U.S. Pat. No. 5,853,801 (Suga et al.), U.S. Pat. No. 5,619,352 (Koch et al.), U.S. Pat. No. 5,978,055 (Van De Witte et al.), and U.S. Pat. No. 6,160,597 (Schadt et al.). A compensator based on discotic liquid crystals according to U.S. Pat. No. 5,583,679 (Ito et al.) and U.S. Pat. No. 5,853,801 (Suga et al.), which discotic liquid crystals have negative birefringence, is widely used. Although it offers improved contrast over wider viewing angles, it suffers larger color shift for gray level images compared to a compensator made of liquid crystalline materials with positive birefringence, according to Satoh et al. ("Comparison of nematic hybrid and discotic hybrid films as viewing angle compensator for NW-TN-LCDs", SID 2000 Digest, pp. 347–349, 2000).

In order to achieve improved performance in the contrast ratio while limiting color shift, one alternative is to use a pair of crossed liquid crystal polymer films (LCP) on each side of a liquid crystal cell, as discussed by Chen et al. ("Wide Viewing Angle Photoaligned Plastic Films", SID 99 Digest, pp. 98–101 1999). A liquid pre-polymer is also used to make a layer for aligning or orientating the LCP layer. This paper states that "since the second liquid pre-polymer/LCP retarder film is coated directly on top of the first LCP retarder film, the total thickness of the final wide-view retarder stack is only a few microns thin." Although this method provides a very compact optical compensator, one of the challenges of this method is to make two LCP layers crossed, particularly in a continuous roll-to-roll manufacturing process.

U.S. Pat. No. 5,853,801 (Suga et al.) teaches a continuous process of preparing an optical compensator by, for example, coating a transparent resin layer on a transparent support, subjecting the layer to a brushing treatment to form an orientation layer, coating a solution of a discotic liquid-crystal compound upon the orientation layer, drying the solution of the liquid-crystal compound to form a coated layer, and heating the coated layer to form a discotic nematic phase.

In EP 646829 A1, the optical compensator is prepared by a process similar to that described by Suga et al. but wherein the steps are performed discontinuously. Thus, the process is not suitable for high volume industrial production.

U.S. Pat. No. 6,160,597 (Schadt et al.) discloses steps for making an optical compensator using discontinuous or independent steps comprising drying, heating, and cooling treatments for periods as long as one hour or more, and therefore this process is also not suitable for high-volume industrial production.

PROBLEM TO BE SOLVED

A problem in the manufacture of optical compensators for widening the viewing-angle characteristics of liquid crystal displays has been preventing defects, especially in a process suitable for industrial production.

In particular, in the preparation of optical compensators in which a series of aligning layers and anisotropic liquid crystal layers have been coated on a support, and in which an anisotropic liquid crystal (LC) layer is UV cured before the application of the next aligning layer, achieving a sufficient and consistent contrast ratio has been difficult. Furthermore, poor adhesion has been encountered between the aligning layer and the LC layer.

SUMMARY OF THE INVENTION

The invention provides an improved process for making an optical compensator for use with liquid crystal displays, which process involves forming an orientation layer and an anisotropic nematic liquid crystal (LC) layer on a support made from cellulose triacetate, glass, or other suitable material. It has been found that adhesion failure can be prevented or reduced by a special thermal treatment of the anisotropic nematic liquid-crystal (LC) layer. In particular, it has been found advantageous to thermally heat the anisotropic nematic liquid-crystal layer after it has been dried, then cooling the layer to near or below its clearing temperature to form the nematic phase, and then curing the liquid crystal layer.

Such a thermal treatment has been found to improve adhesion in the resulting optical-compensator product. Furthermore, the thermal treatment has been found to beneficially affect the final contrast properties of the optical compensator.

In one embodiment of the invention, a relatively slow rate of cooling has been found to result in an improved contrast ratio between the bright and dark states of the optical compensator.

In another embodiment, a post-curing heat treatment of the optical compensator has been found to minimize stress and stress-related defects in the final product.

The present process can be used to make an optical compensator that widens the viewing-angle characteristics of liquid crystal displays, and in particular of Twisted Nematic (TN), Super Twisted Nematic (STN), Optically Compensated Bend (OCB), In Plane Switching (IPS), or Vertically Aligned (VA) liquid crystal displays.

In particular, there is provided by the invention an improved process for the preparation of an optical compensator comprising the following steps:

i) coating, in a solvent, a resin capable of forming an orientation layer on a surface of a transparent support;
ii) drying the coating to form a transparent resin layer;
iii) subjecting the transparent resin layer to orientation treatment to obtain an orientation layer;
iv) coating, in a solvent, a nematic liquid-crystalline (LC) compound onto the orientation layer to form an LC coating;
v) drying the LC coating to form an LC layer;
vi) optionally heating the LC layer;
vii) cooling the LC layer to form a nematic phase, thereby obtaining an anisotropic nematic liquid-crystalline layer; and
viii) curing and/or polymerizing a reactive compound in the anisotropic nematic liquid-crystalline layer.

Preferred embodiments of the above-mentioned process for preparing an optical compensator film are as follows:

1) The above process wherein step i) is conducted by coating a photo-orientable material, in a solvent, on the transparent support; and step iii) is conducted by a photo-alignment technique whereby an orientation layer is formed.
2) The above process wherein step iii) is conducted by exposing a surface of the transparent resin layer on the transparent support to polarized light to impart orientation to the transparent resin layer, whereby an orientation layer is formed.
3) The above process wherein step iv) is conducted by coating a polymerizable nematic compound, in a solvent, on the orientation layer; and step vii) is conducted by cooling the coating to form a positive-birefringence nematic phase, and thereafter exposing the layer to light so as to polymerize the nematic compound.
4) The above process wherein step iv) comprises coating a solvent solution of the nematic LC compound on the orientation layer using a slot-hopper coating method.
5) The above process wherein step v) is conducted by vaporizing the solvent from the coating by applying heated gas or infrared radiation or microwave radiation to both sides of the transparent support.
6) The above process wherein step v) is conducted by vaporizing the solvent from the coated layer by applying heated gas or infrared radiation or microwave radiation to the side of the transparent support having no coated layer, or bringing the side of the transparent support opposite from the coated layer into contact with a heated roller.
7) The above process wherein step vi) is conducted by heating the coated layer by applying heated gas or infrared radiation or microwave radiation to both sides of the transparent support.
8) The above process wherein step vii) is conducted by applying cooled gas to both sides (surfaces) of the transparent support, or bringing the side of the transparent support having no coated layer into contact with at least one cooled roller.

There is also provided by the invention a process for the preparation of a continuous optical compensator film comprising the continuous steps of:

i) coating a nematic liquid-crystalline (LC) compound, in a solvent, onto an orientation layer formed on a transparent support; to obtain an LC coating;
ii) drying the LC coating to form an LC layer;
iii) optionally heating the LC layer;
iv) cooling the LC layer to form a nematic phase, thereby obtaining an anisotropic nematic liquid-crystalline layer; and
v) curing and/or polymerizing a reactive compound in the anisotropic nematic liquid-crystalline layer.

In a preferred embodiment, the process is a continuous process and the transparent support having the orientation layer and the layer of nematic compound is wound into a roll.

A preferred embodiment of the latter process for preparing an optical compensator comprises the following steps:

1) The process wherein step i) is conducted by coating a polymerizable or curable nematic compound having liquid crystalline properties, in a solvent, on the orientation layer.
2) The process wherein step (i) is conducted by coating the LC compound using a slot-hopper coating method.
3) The process wherein the step iv) is conducted by cooling the LC layer to form a positive-birefringence nematic phase, thereby obtaining an anisotropic nematic liquid-crystalline layer.
4) The process wherein the step iv) is conducted by cooling the LC layer to form a positive-birefringence nematic phase and exposing the layer to light so as to polymerize the nematic compound.

There is also provided by the invention a continuous process for the preparation of an optical compensator support comprising the following continuous steps:

i) applying a liquid coating comprising a nematic liquid-crystalline compound onto an orientation layer of a moving continuous transparent support by means of a slot-hopper coating method, whereby the orientation layer was formed on the transparent support using a continuous process;
ii) drying the liquid coating to form a liquid-crystal-containing (LC) layer;
iii) optionally heating the LC layer;

iv) cooling the LC layer to form a nematic phase, thereby obtaining an anisotropic nematic liquid-crystalline layer; and;

v) optionally winding up the transparent support having the orientation layer and the LC layer.

A preferred embodiments of the latter process for preparing an optical compensator comprises conducting step i) by coating a polymerizable nematic compound, in a solvent, on the orientation layer; and step iv) is conducted by cooling the LC layer to form a positive-birefringence nematic phase and thereafter exposing the layer of positive-birefringence nematic phase to light so as to polymerize and/or cure the nematic compound.

Still another embodiment of the present inventive process for the preparation of an optical compensator comprising at least two liquid-crystalline layers, which process comprises the steps of:

i) applying a coating liquid, comprising a resin in a solvent, to a transparent support, to form a resin-containing coating capable of forming an orientation layer;

ii) drying the coating to form a transparent resin layer;

iii) subjecting the transparent resin layer to orientation treatment to obtain an orientation layer;

iv) coating a nematic liquid-crystalline (LC) compound, in a solvent, onto the orientation layer, to obtain a liquid-crystal-containing coating;

v) drying the liquid-crystal-containing coating to form a liquid-crystal-containing layer;

vi) optionally heating the liquid-crystal-containing layer;

vii) cooling the liquid-crystal-containing layer to form a nematic phase, thereby obtaining an anisotropic nematic liquid-crystalline layer; and viii) curing and/or polymerizing a reactive compound in the anisotropic nematic liquid-crystalline layer.

ix) again applying a coating liquid, comprising a resin in a solvent, to a transparent support, to form a second resin-containing coating capable of forming an orientation layer;

x) drying the second resin-containing coating to form a second transparent resin layer;

xi) subjecting the second transparent resin layer to a second orientation treatment to obtain a second orientation layer, wherein the orientation treatment may be at a second orientation angle relative to the first orientation layer;

xii) again coating a nematic liquid-crystalline (LC) compound, in a solvent, onto the second orientation layer, to obtain a second liquid-crystal-containing coating;

xiii) drying the second liquid-crystal-containing coating to form a second liquid-crystal-containing layer;

xiv) heating the second liquid-crystal-containing layer;

xv) cooling the second liquid-crystal-containing layer to form a nematic phase, thereby obtaining a second anisotropic nematic liquid-crystalline layer; and xvi) curing and/or polymerizing a reactive compound in the second anisotropic nematic liquid-crystalline layer.

Preferably the latter process is continuously carried out and, instead of making discrete sheets or glass plates, and the final step of the process comprises winding up a continuous compensator sheet comprising a transparent support having a series of orientation layers and anisotropic nematic liquid-crystalline layers.

Preferred embodiments of the latter process for preparing an optical compensator film are as follows:

1) The above process wherein step i) and ix) comprises coating a photo-orientable material in a solvent onto the underlying layer, either a transparent support or a liquid-crystal-containing layer, 2) The above process wherein step iii) and xi) is conducted by exposing a surface of the transparent resin layer to polarized light to impart orientation, whereby an orientation layer is formed.

3) The above process wherein step iv) and xii) is conducted by coating a polymerizable anisotropic nematic compound having liquid crystalline properties in a solvent onto the orientation layer; and the step vii) and xv) is conducted by cooling the liquid-crystal-containing layer to form a positive-birefringence nematic phase, and thereafter exposing the layer of positive-birefringence nematic phase to light so as to polymerize and/or cure a reactive compound (preferably the liquid-crystal compound) in the anisotropic nematic liquid-crystal-containing layer.

4) The above process wherein the step iv) and xii) is comprises using a slot-hopper, slide-hopper or gravure method to coat the nematic liquid-crystalline (LC) compound onto the orientation layer.

5) The above process wherein step v) and xiii) is conducted by vaporizing the solvent from the coating by applying heated gas or infrared radiation or microwave radiation to both sides of the transparent support.

6) The above process wherein step v) and xiii) is conducted by vaporizing the solvent from the coating by applying heated gas or infrared radiation or microwave radiation to the side of the transparent support opposite the coatings, or by bringing the side of the transparent support into contact with a heated roller.

7) The above process wherein the step vi) and xiv) is conducted by heating the liquid-crystal-containing layer by applying heated gas or infrared radiation or microwave radiation to both sides of the transparent support, or bringing the side of the transparent support opposite the coated layers into contact with a (at least one) heated roller.

8) The above process wherein the step vii) and xv) is conducted by cooling the coated layer to form a positive-birefringence nematic phase, whereby a layer of anisotropic nematic compound is formed.

9) The above process wherein the above vii and xv) is conducted by cooling the coated layer by applying cooled gas to both sides (surfaces) of the transparent support, or bringing the side of the transparent support opposite the coated layers into contact with cooled rollers.

DETAILED DESCRIPTION OF THE INVENTION

Figure 1:
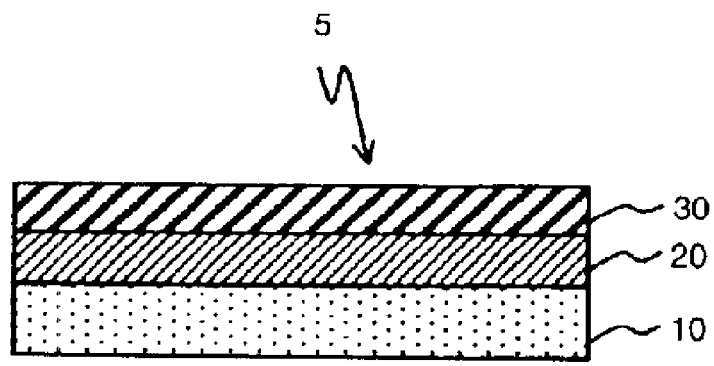
FIG. 1 is a cross-sectional schematic view of a compensator prepared by the process of the present invention.

The current invention regarding the optical compensator for liquid crystal displays is described by referring to the drawings as follows.

FIG. 1 shows a cross-sectional schematic view of an optical compensator 5 which can be made according to the present invention. This compensator comprises a substrate 10 of transparent material, such as glass or polymer. It should be understood that to be called as a substrate, a layer must be solid and mechanically strong so that it can stand alone, and support other layers. A typical substrate is a transparent support made of triacetate cellulose (TAC), polyester, polycarbonate, polysulfone, polyethersulfone, or other transparent polymers, and has a thickness of 25 to 500 micrometers. Substrate 10 typically has low in-plane retardation, preferably less than 10 nm, and more preferably less than 5 nm. In some other cases, the substrate 10 may have larger in-plane retardation between 15 to 150 nm. Typically, when the substrate 10 is made of triacetyl cellulose, it has out-of-plane retardation around −40 rim to −120 nm. This is a desired property when the compensator is designed to compensate a liquid crystal state with an ON voltage applied. The in-plane retardation discussed above is defined as the absolute value of $(nx-ny)d$ and the out-of-plane retardation discussed above is defined as $[nz-(nx+ny)/2]d$, respectively. The refractive indices $nx$ and $ny$ are along the slow and fast axes in plane of the substrate, respectively, $nz$ is the refractive index along the substrate thickness direction (Z-axis), and $d$ is the substrate thickness. The substrate is preferably in the form of a continuous (rolled) support or web.

On the substrate 10, an orientation layer 20 is applied, and an anisotropic layer 30 is disposed on top of layer 20. Optionally, between the substrate 10 and the orientation layer 20, a barrier layer can be applied (barrier layer not shown in FIG. 1). Barrier layers are disclosed in copending applications Ser. No. 10/194,162, Nair et al. and Ser. No. 10/194,130, Bauer et al. hereby incorporated by reference in their entirety.

The orientation layer 20 can be oriented by various techniques. In one example, the orientation layer contains a rubbing-orientable material such as a polyimide or polyvinyl alcohol and can be oriented by a rubbing technique. In another example, the orientation layer contains a shear-orientable material and can be oriented by a shear-alignment technique. In another example, the orientation layer contains an electrically or magnetically orientable material and can be oriented by an electrical or magnetic alignment technique. In another example, the orientation layer can also be a layer of SiOx fabricated by oblique deposition. In another example, the orientation layer contains a photo-orientable material and can be oriented by a photo-alignment technique. Photo-orientable materials include, for example, photo isomerization polymers, photo dimerization polymers, and photo decomposition polymers. In a preferred embodiment, the photo-orientable materials are cinnamic acid derivatives as disclosed in U.S. Pat. No. 6,160,597. Such materials may be oriented and simultaneously crosslinked by selective irradiation with linear polarized UV light.

In a preferred embodiment, the anisotropic layer 30 is typically a liquid crystalline monomer when it is first disposed on the orientation layer 20, and is crosslinked or polymerized by a further UV irradiation, or by other means such as heat. In a preferred embodiment, the anisotropic layer contains a material such as a diacrylate or diepoxide with positive birefringence as disclosed in U.S. Pat. No. 6,160,597 (Schadt et aL) and U.S. Pat. No. 5,602,661 (Schadt et al.). The optic axis in the anisotropic layer 30 is usually tilted relative to the layer plane, and varies across the thickness direction.

The temperature at which the liquid crystal compound undergoes a phase transition between the nematic phase and the isotropic phase is defined as the transition temperature $T_c$ (also referred to as the clearing temperature).

While the type of compensator described above provides some desired optical properties, additional layers are necessary for wide viewing-angle compensation, for example, in a compensator for Twisted Nematic (TN) Liquid Crystal Displays (LCDs).

The anisotropic layer may also contain addenda such as surfactants, light stabilizers and UV initiators. UV initiators include materials such as benzophenone and acetophenone and their derivatives; benzoin, benzoin ethers, benzil, benzil ketals, fluorenone, xanthanone, alpha and beta naphthyl carbonyl compounds and various ketones. Preferred initiators are alpha-hydroxyketones.

The anistropic layer may also contain a curable and/or polymerizable addenda such as di or triacrylate monomers, in addition to or instead of a polymerizable liquid-crystalline material.

Figure 2A:
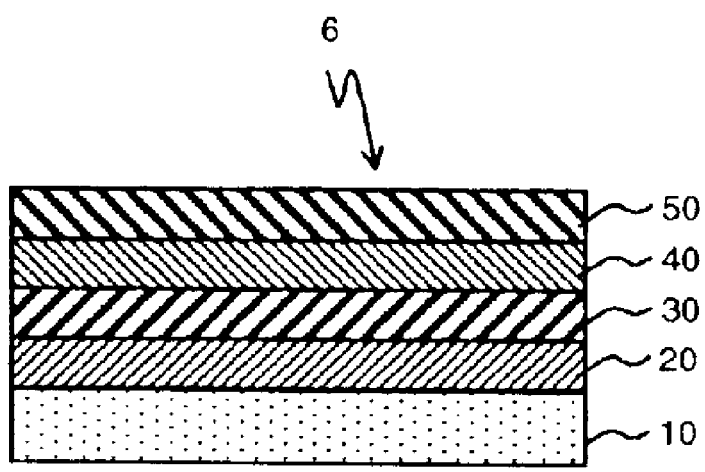
FIGS. 2A and 2B are cross-sectional schematic views of various embodiments prepared by the process of the present invention.
Figure 3:
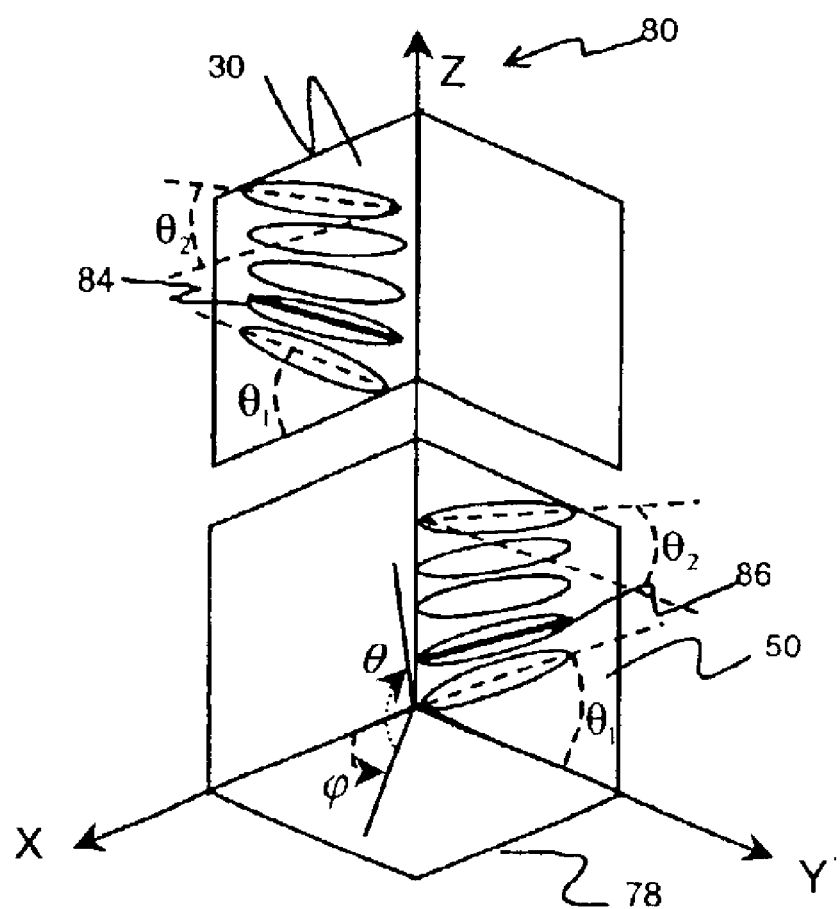
FIG. 3 is a schematic concept in accordance with the present invention.

FIG. 2A illustrates a more sophisticated optical compensator 6 that may be made in accordance with the invention, which compensator contains a second orientation layer 40 and a second anisotropic layer 50 on top of the first anisotropic layer 30. The second orientation layer 40 and the second anisotropic layer 50 can be made essentially in the same way as the first orientation layer 20 and the first anisotropic layer 30 are made, except that the direction of the orientation may vary. For the purpose of illustration, refer to an XYZ coordinate system 80 as shown in FIG. 3. The X and Y axes are parallel to the plane of substrate 78, and the Z-axis is perpendicular to the plane of substrate 78. The angle φ is measured from the X-axis in the XY plane, and referred as an azimuthal angle. The angle θ is measured from the XY plane, and referred as a tilt angle.

It should be understood that the optical axis in each of the anisotropic layers 30 and 50 can have a variable tilt angle and/or variable azimuthal angle. For example, the optic axis 84 in the anisotropic layer 30 has a variable tilt angle θ across the Z-axis ranging from $\theta_1$ to $\theta_2$. In another example, the optic axis 84 has a fixed tilt angle θ across the Z-axis, namely, $\theta_1=\theta_2$. In another example, the optic axis 84 is contained in one plane such as the XZ plane and consequently has a fixed azimuthal angle φ across the Z-axis. In another example, although the anisotropic layer 30 is still oriented along the preferred direction forced by the orientation layer at their interface, the optic axis 84 has a variable azimuthal angle φ across the Z-axis. The azimuthal angle of the optic axis 84 can be varied by adding a proper amount of chiral dopant into the anisotropic layer 30. In another example, the optic axis 84 has a variable tilt angle θ and a variable azimuthal angle φ across the Z-axis. Like the optic axis 84 of the anisotropic layer 30, the optic axis 86 of the anisotropic layer 50 can also have a fixed tilt angle, a variable tilt angle, a fixed azimuthal angle, a variable azimuthal angle, or a variable tilt angle and a variable azimuthal angle across the Z-axis. The anisotropic layers 30 and 50 typically have different optic axis. Preferably the anisotropic layer 30 is positioned orthogonally relative to the respective optic axis of the anisotropic layer 50 about an axis perpendicular to the plane of the substrate. Even though the optic axis of the anisotropic layer 30 is preferred to be orthogonal (or ±90 degrees) relative to the respective (or counterpart) optic axis of the anisotropic layer 50 about an axis perpendicular to the plane of the substrate, it should be understood that the angle between the optic axis of the two anisotropic layers can be in a range of 85 to 95 degrees to be considered as orthogonal.

For the manufacture of more complex layer structures than that illustrated in FIG. 2A, additional orientation and anisotropic layers can be applied in further steps.

Figure 2B:
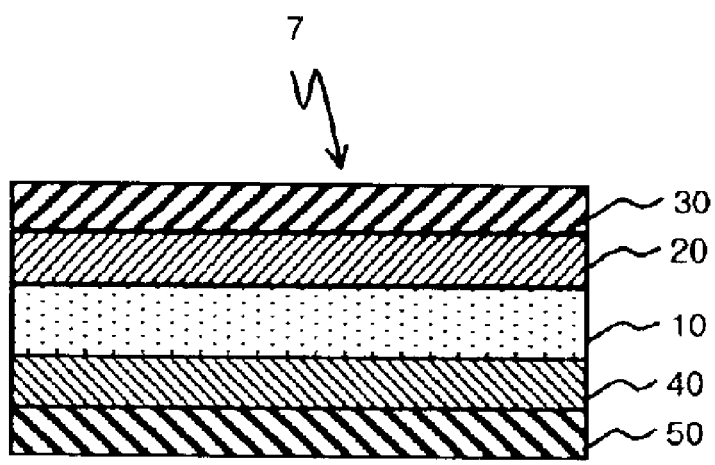

FIG. 2B illustrates another optical compensator 7 manufacturable by the inventive process in which the second orientation layer 40 and the second anisotropic layer 50 are on the opposite side of the substrate from the first orientation layer 20 and the first anisotropic layer 30.

Figure 5:
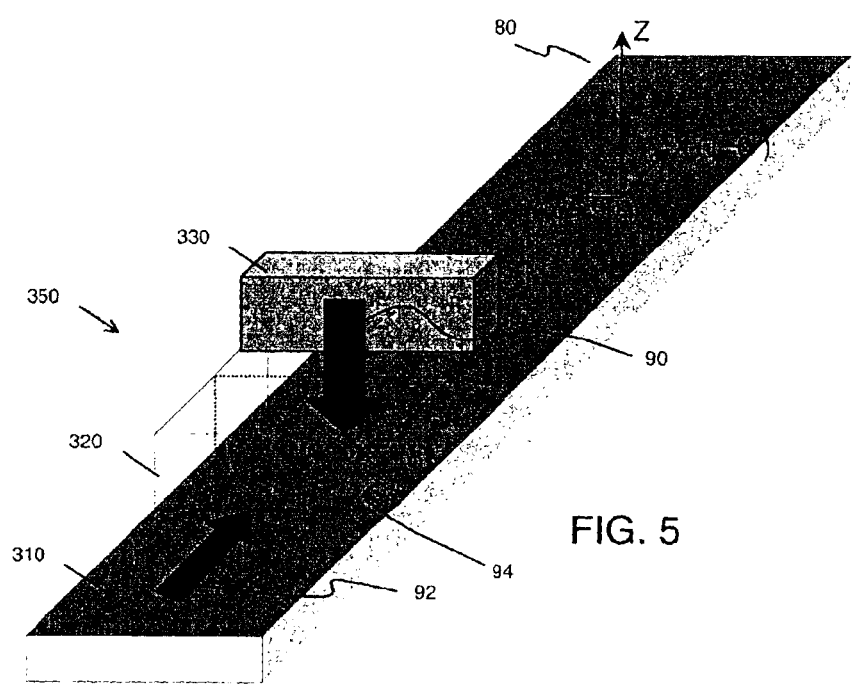
FIG. 5 shows a roll-to-roll process for making a compensator according to the present invention.

According to another aspect of the present invention, a compensator 350 can be manufactured on a roll-to-roll basis as shown in FIG. 5, which shows part of a schematic view of the process. The roll-to-roll process of forming a compensator 350 comprises the steps of applying an orientation layer 320, for example by coating the orientable material in a solvent, onto a moving substrate 310, drying the orientation layer 320, orienting the orientation layer 320 in a predetermined alignment direction φ 94, (for example φ can equal 0° to 90°) relative to the roll moving direction 92, roll coating an anisotropic layer 330 including a polymerizable material in a solvent carrier onto the orientation layer 320, drying the anisotropic layer 330, polymerizing the anisotropic layer 330 to form a continuous web of compensator. Note that for clarity, FIG. 5 only shows part of the orientation layer 320 and anisotropic layer 330.

In one embodiment, the orientation layer is oriented by rubbing the orientation layer in a direction 94 of 90 degrees (φ=90°) relative to the roll moving direction 92. In another embodiment, the orientation layer is oriented by a photoalignment technique; for example, the orientation layer is exposed to a linearly polarized ultraviolet (UV) light indicated by 90. It may or may not be collimated, however, the projection (pointing along 94) of the principal ray of the light 90 onto the roll makes an angle of about 90 degrees relative to the roll moving direction.

Figure 4:
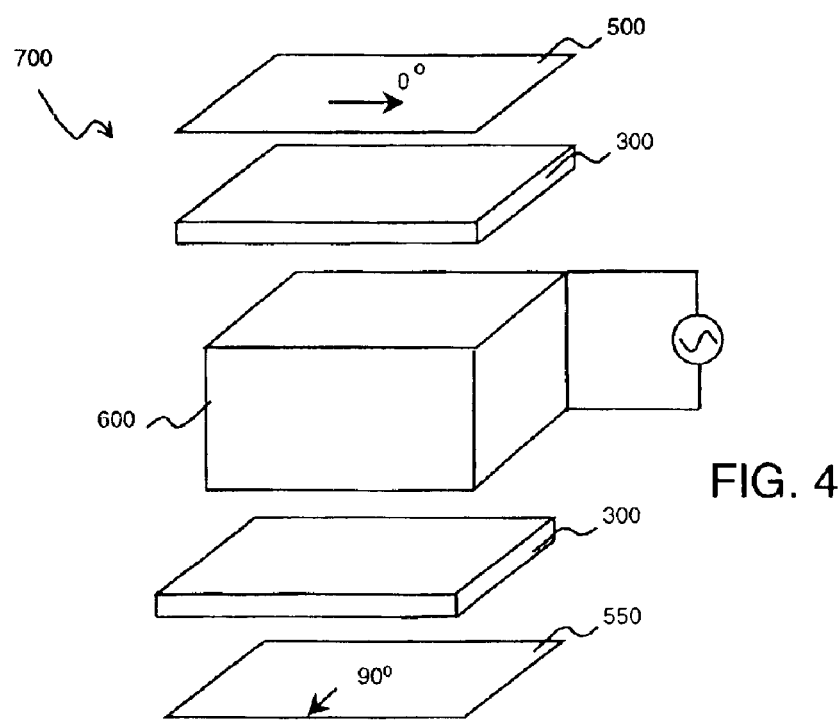
FIG. 4 shows a liquid crystal display in combination with a compensator prepared according to the present invention.

FIG. 4 is a schematic view of a liquid crystal display 700 comprising the compensator 300, also manufacturable in accordance with the present invention. In FIG. 4, one compensator 300 is placed between the first polarizer 500 and the liquid crystal cell 600, and another compensator 300 is placed between a second polarizer 550 and the liquid crystal cell 600. The liquid crystal cell 600 is preferred to be operated in a Twisted Nematic (TN), Super Twisted Nematic (STN), Optically Compensated Bend (OCB), In Plane Switching (IPS), or Vertically Aligned (VA) mode. The polarizers 550 and 500 can be arranged crossed or parallel depending on the operation principles of the liquid crystal cell. The orientation layer in the compensator can be arranged parallel, perpendicular, or at a predetermined angle relative to the first polarizer 500. The liquid crystal cell can also be operated in a reflective mode, in which it may only require one polarizer.

The compensators made by the present invention may be used in conjunction with electronic imaging device comprising a liquid crystal display device. The energy required to achieve the display device is generally much less than that required for the luminescent materials used in other display types such as cathode ray tubes. Accordingly, liquid-crystal display technology is used for a number of applications, including but not limited to digital watches, calculators, portable computers, electronic games for which light weight, low power consumption and long operating life are important features.

In one preferred embodiment for making an optical compensator, the orientation layer can be disposed on substrate on a continuous web. Preferably, the orientation layer contains a photo-orientable material such as cinnamic acid derivatives that can be oriented by a photo-alignment technique. The solvent can include a mixture of organic solvents such as MEK, cyclohexane and isopropyl acetate. After the orientation effect is achieved by linear polarized UV light, a mixture of liquid crystalline monomers such as diacrylates, UV initiator and solvent is applied onto the orientation layer. The solvent then evaporates and liquid crystalline monomers are crosslinked and/or cured by UV irradiation.

Figure 6:
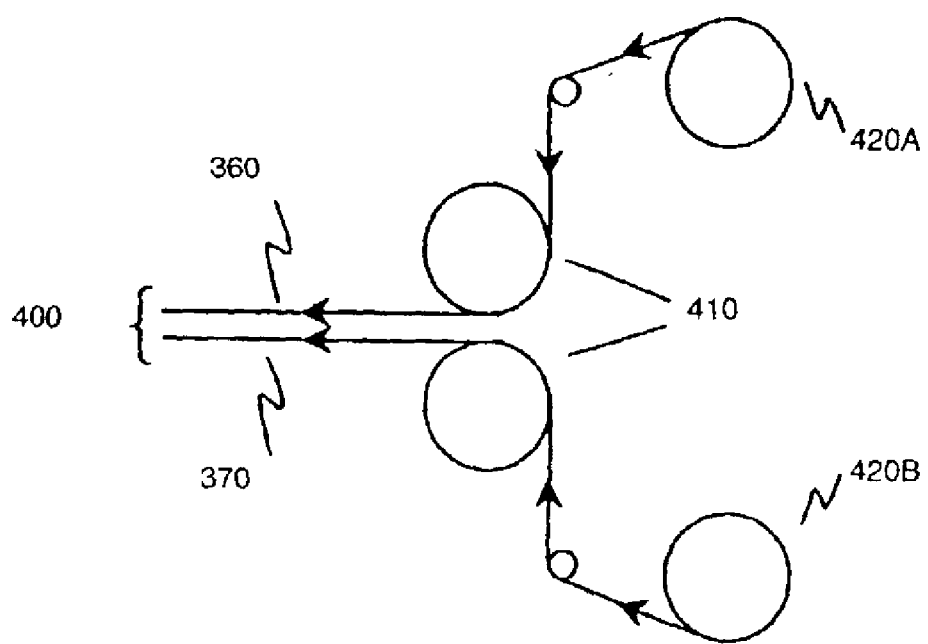
FIG. 6 shows another roll-to-roll process for making a compensator according to the present invention in which two components are bonded.

According to another embodiment of a process according to the present invention, the compensator can be manufactured on a roll-to-roll basis as shown in FIG. 6 with reference to FIG. 5. The roll-to-roll process of forming a roll of optical compensator 400 comprises the steps of coating an orientation layer 320 in a solvent onto a moving substrate 310, drying the orientation layer 320, orienting the orientation layer 320 in a predetermined alignment direction 94 of 45 degrees (φ=45°) relative to the roll moving direction 92, roll coating an anisotropic layer 330 including a polymerizable material in a solvent carrier onto the orientation layer 320, drying the anisotropic layer 330, polymerizing the anisotropic layer 330 to form a first roll of multilayer integral component 360, winding it up, repeating the above steps to form a second roll of multilayer integral component 370, and bonding together the two rolls of integral components 360, 370 made according to the above processes so that the optic axis of the anisotropic layer in one component is positioned orthogonally relative to the respective optic axis of the anisotropic layer in the other about an axis perpendicular to the plane of the substrates using a roll-to-roll laminator 410. One feature of the roll-to-roll manufacturing process according to the invention to fabricate the optical compensator 400 is that the orientation layer 320 contained in a roll of component 360 is oriented in a direction 94 of 45 degrees (φ=45°) relative to the roll moving direction 92, so that when two rolls of such components (for example, 360 and 370) are bonded together by a roll-to-roll laminator 410, the anisotropic layer in one component can be positioned orthogonally relative to the anisotropic layer in the other about an axis perpendicular to the plane of the substrates.

FIG. 6 shows that two rolls of components 360 and 370 are provided from two supply rollers 420A and 420B, and are bonded together by a roll-to-roll laminator 410 to form a roll of optical compensator 400. The two rolls of components (for example, 360 and 370) can be bonded together at the substrates of the two components or at the anisotropic layers of the two components. When the two rolls of components are bonded together at the substrate of one component and the anisotropic layer of the other component, the formed roll of optical compensator 400 does not meet the requirement that the optic axis of the anisotropic layer in one component is positioned orthogonally relative to the respective optic axis of the anisotropic layer in the other about an axis perpendicular to the plane of the substrates. Instead, the optic axis of the anisotropic layer in one component is positioned parallel relative to the respective optic axis of the anisotropic layer in the other. If the orientation layers in the roll of components (for example, 360 and 370) are not oriented in a direction of 45 degrees relative to the roll moving direction, the optical compensator 400 made by bonding two rolls of such components at the anisotropic layers of the two components or at the substrates of the two components will not meet the requirement that the optic axis of the anisotropic layer in one component is positioned orthogonally relative to the respective optic axis of the anisotropic layer in the other about an axis perpendicular to the plane of the substrates. Instead, the angle between the optic axis of the anisotropic layer in one component and the optic axis of the anisotropic layer in the other is either greater than or less than 90 degrees. Although the orientation layer in the roll of component is preferred to be oriented in a direction of 45 degrees relative to the roll moving direction, it should be understood within the scope of the invention that the orientation layer can be oriented in a range of directions around 45 degrees from 40 to 50 degrees relative to the roll moving direction. Note that two rolls of components with the orientation layers oriented at two different predetermined directions may also be bonded using a roll-to-roll laminator to form a roll of optical compensator satisfying the requirement that the optic axis of the anisotropic layer in one component is positioned orthogonally relative to the respective optic axis of the anisotropic layer in the other about an axis perpendicular to the plane of the substrates.

As indicated above, the orientation layer can be oriented by a photo-alignment technique; for example, the orientation layer is exposed to a linearly polarized ultraviolet (UV) light indicated by 90. The UV light 90 makes an angle with the roll. It may or may not be collimated, however, the projection (pointing along 94) of the principal ray of the light 90 onto the roll makes an angle of about 45 degrees relative to the roll moving direction.

In a preferred process of making an optical compensator, the steps are continuously performed (i.e., performed in nonstop process). Further, it is preferred that the steps extending from the step of feeding the transparent support to the orientation treatment are continuously performed. The process can be, for example, performed according to the following steps:

a) coating a liquid composition, comprising an orientable resin in a solvent, to form a resin-containing coating on a moving continuous support;

b) drying the resin-containing coating with a heated gas to vaporize the solvent;

c) optionally heat treating, not necessarily at a temperature higher than drying, to relax stress built up in the coating during drying as well as continuing to remove residual solvent from the dried coating, wherein the coated continuous support is heat treated between 25° C. and 300° C., preferably under 110° C., more preferably between 40° C. and 100° C. for a period of at least 30 seconds;

d) optionally reducing the temperature to below 80° C., more preferably below 60° C.;

e) orienting the resin-containing layer in a predetermined direction by rubbing or photo-alignment to form an orientation layer;

f) coating a nematic liquid crystalline compound, preferably a polymerizable and/or curable material, in a solvent carrier onto the orientation layer;

g) drying the liquid-crystal-containing layer to vaporize solvent for a period of 4 seconds to 10 minutes, preferably 30 seconds to 10 minutes with a heated gas to remove solvent until at least 50 percent, preferably 50 to 99 percent, more preferably 80 to 99 percent of the solvent is removed or wherein the difference between the temperature of spent air and the supply air is less than 5° F., preferably 3° F. of the supply air in the drying unit, thereby forming a liquid-crystal-containing layer;

h) after drying is complete, heating the layered support, preferably a continuous web, comprising the nematic liquid-crystal-containing layer to promote adhesion, whereas the temperature is above 50° C., preferably above 80° C. for 30 seconds to 10 minutes;

i) cooling the liquid-crystal-containing layer to near or below its nematic-isotropic phase transition temperature or clearing temperature (Tc) for at least 5 seconds, preferably 5 seconds to 30 minutes, until the entire layer reaches the nematic phase, preferably a positive birefringence nematic phase, thereby forming an anisotropic nematic liquid-crystal-containing layer;

j) optionally cooling again in order that the continuous support temperature will not rise above Tc during subsequent exposure to UV radiation;

k) polymerizing the anisotropic nematic liquid-crystal-containing layer with UV light at a temperature below the Tc of the anisotropic nematic layer to form an integral component; and In another embodiment, the process further comprises heating the integral component to relax the anisotropic nematic liquid-crystal-containing layer. Such a process comprises:

a) coating a liquid composition, comprising an orientable resin in a solvent, to form a resin-containing coating layer, preferably on a moving continuous support;

b) drying the resin-containing layer, preferably with a heated gas to vaporize the solvent, thereby forming a resin-containing orientable layer;

c) optionally heat treating, not necessarily at a temperature higher than drying, to relax stress built up in the orientable layer during drying as well as continuing to remove residual solvent from the orientable layer, wherein the coated, preferably continuous, support is heat treated between 25° C. and 300° C., preferably under 110° C., more preferably between 40° C. and 100° C. for a period of at least 30 seconds;

d) optionally reducing the temperature to below 80° C., more preferably below 60° C.;

e) orienting the orientation layer in a predetermined direction, preferably by rubbing or photo-alignment;

f) coating a liquid comprising a nematic liquid-crystal compound, preferably a polymerizable compound, in a solvent carrier onto the orientation layer;

g) drying the liquid-crystal-containing coating to vaporize solvent for a period of 4 seconds to 10 minutes, preferably 30 seconds to 10 minutes with a heated gas to remove solvent until at least 50 percent, preferably 50 to 99 percent, more preferably 80 to 99 percent of the solvent is removed or wherein the difference between the temperature of spent air and the supply air is less than 5° F., preferably 3° F. of the supply air in the drying unit.

h) after drying is complete, heating the continuous web with the nematic liquid-crystal-containing layer to promote adhesion, whereas the temperature is above 50° C., preferably above 80° C. for 30 seconds to 10 minutes;

i) cooling the anematic layer liquid-crystal-containing layer to near or below its nematic-isotropic phase transition temperature (Tc) for at least 5 seconds, preferably 5 seconds to 30 minutes, to form the nematic phase, preferably a positive birefringence nematic phase, thereby forming an anisotropic nematic liquid-crystal-containing layer;

j) optionally cooling again in order that the continuous coated support temperature will not rise above Tc during subsequent UV curing;

k) polymerizing and/or curing with UV light at a temperature below the Tc of the anisotropic nematic liquid-crystal-containing layer to form an integral component; and l) heating the integral component to relax the anisotropic nematic liquid-crystal-containing layer, wherein the integral component is heated between 30° C. and 300° C., preferably between 30° C. and 110° C.

Typically, the process further comprises winding up the transparent support having the orientation layer and the layer of anisotropic nematic liquid-crystal-containing layer thereon. Further layers of orientation and liquid-crystal-containing layers can be added to the support as suggested above.

Preferably, the drying and heating of the orientation layer and anisotropic nematic liquid-crystal layer is in a separate drying and heating unit. In a preferred embodiment, the drying unit for drying the orientation layer or the anisotropic nematic liquid-crystal layer comprises air distributors to deliver air to both sides of the coated support as well as rollers and air bars. Suitably, the heating unit for the orientation layer also comprises air distributors to deliver air to both sides of the coated support as well as backside rollers that provide energy to the support via conduction. However, preferably the heating unit for the anisotropic nematic liquid-crystal layer comprises air flotation devices within a housing to deliver high temperature air to both sides of the coated support.

As described in further detail below, one embodiment of the invention comprises repeating the above steps in series to form a plurality of orientation layers and a plurality of anisotropic layers to form an integral component wherein the optic axis of each anisotropic layer is positioned relative to the respective optic axis of the other anisotropic layers by some small angle about an axis perpendicular to the plane of the substrates. Preferably, there are a first and second orientation layer and a first and second anisotropic layer to form an integral component so that the optic axis of the first anisotropic layer is positioned orthogonally relative to the respective optic axis of the second anisotropic layer about an axis perpendicular to the plane of the substrates, obtained either by coating in series or in parallel.

Figure 7:
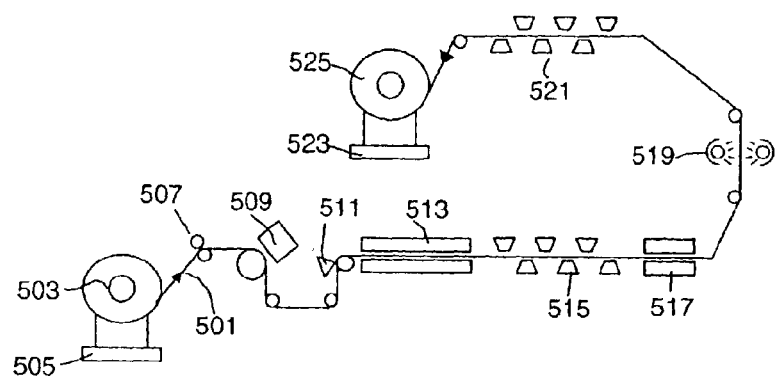
FIG. 7 shows one embodiment of a process for making an anisotropic liquid crystal coated support.

The processes of the invention are explained in detail referring to the attached figures. FIG. 7 schematically shows an example of the process for the preparation of the continuous optical compensator film of the invention. The continuous transparent support containing an oriented resin layer thereon 501 is fed from a roll of continuous support containing an oriented resin layer thereon 503 using a delivery machine 505 having a driver means. Optionally dust on a surface of the support can be removed using a surface dust-removing machine 507. A web treatment (Corona discharge, glow discharge, particle transfer roll etc.) can be performed by apparatus 509. The continuous transparent support having the orientation layer is moved using a driving roller toward a coating machine 511. A coating liquid of a liquid crystal compound having liquid crystalline property in a solvent is coated on the orientation layer using the coating machine 511 to form a coated layer. Subsequently, the solvent in the coated layer is vaporized, and the coated layer is heated to form a liquid-crystal polymer phase in a drying zone 513 and then in a heating zone 515. Again the heating and drying means can utilize IR, conduction, and/or air convection, etc. The coated liquid-crystal polymer compound on top of the oriented resin layer is then cooled in a cooling zone 517 to form a nematic phase, preferably a positive birefringence nematic phase.

The anisotropic nematic layer is exposed to ultraviolet light (UV light) emitted by UV lamp 519, which can be a non-polarized flood light, to form a cured layer. In the case that a non-polymerizable anisotropic liquid crystal compound is used, the anisotropic nematic is cooled after heating to solidify the liquid crystal compound. The anisotropic nematic layer is generally cooled rapidly so as not to destroy the oriented liquid crystal phase.

The transparent support having the orientation layer and the anisotropic nematic layer thereon generally is checked as to if the compensator film is acceptable or not. The optical characteristics of the compensator film can be measured, for example, by a device that determines whether the orientation condition of the anisotropic nematic layer is achieved. The check can be conducted by continuously measuring the optical characteristics of the compensator film.

Subsequently, an optional heat treatment can by applied 521 in order to stress relax the transparent support having the orientation layer and the anisotropic nematic layer.

Subsequently, an optional protective film can be superposed on the transparent support having the orientation layer and anisotropic nematic layer thereon using a laminator in such a manner that the protective film is in contact with the anisotropic nematic layer to form a composite film, and the composite film is wound up in a roll 525 by a wind-up machine 523.

Figure 8:
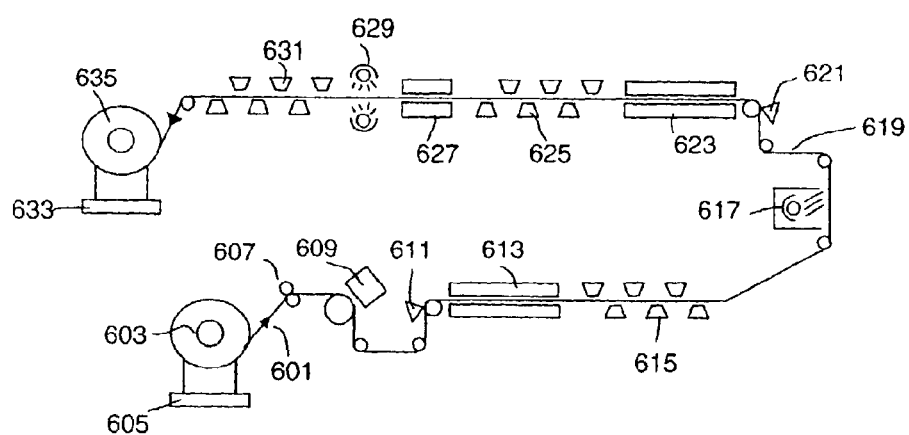
FIG. 8 shows one embodiment of a process for making a two-layer system comprising a single orientation layer and a single anisotropic liquid crystal layer.

FIG. 8 schematically shows an example of the process for the preparation of the continuous optical compensator film of the invention. The continuous transparent support 601 is fed from a roll of continuous support 603 using a delivery machine 605 having a driver means. Optionally dust on a surface of the support can be removed using a surface dust-removing machine 607. A web treatment (Corona discharge, glow discharge, particle transfer roll etc.) can be performed by apparatus 609. The continuous transparent support is moved using a driving roller toward a coating machine 611. A coating liquid of a pre-polymer or resin for forming an orientation layer in a solvent is coated using a coater 611 on the surface of the support. The coater can be a slide, slot, gravure, roll coater, etc. The coated layer is then dried in a drying zone 613 to form a transparent resin orientable layer on the support. Drying can be accomplished by IR, conduction, air convection, microwave, etc. Heat treatment by means of heaters 615 can also used and accomplished by IR, conduction, air convection, etc. The transparent support having the orientable resin layer is then subjected to UVB light using a polarized UVB light source 617 to form an orientation layer. An optional heat treatment 619 can be employed to reduce stress and remove remaining residual solvents in the orientation layer.

The continuous transparent support having the orientation layer is moved using a driving roller toward a coating machine 621. A coating liquid of a liquid crystal compound having liquid crystalline property in a solvent is coated on the orientation layer using the coating machine 621 to form a coated layer. Subsequently, the solvent in the coated layer is vaporized in a dryer 623, and the coated layer is heated, in a heating section 625 to promote adhesion of the anisotropic nematic liquid crystal layer to the orientation layer. Again the heating and drying means can utilize IR, conduction, and/or air convection.

The anisotropic nematic layer on top of the oriented resin layer is then cooled in a cooling zone 627 to form a nematic phase.

The anisotropic nematic layer is exposed to ultraviolet light (UV light) emitted by UV lamp 629, which can be a non-polarized flood light, to form a cured layer. In the case that a non-polymerizable anisotropic liquid crystal compound is used, the anisotropic nematic layer is cooled after heating to solidify the liquid crystal. The anisotropic nematic layer d is generally cooled rapidly so as not to destroy the oriented liquid crystal phase. The transparent support having the orientation layer and anisotropic liquid crystal layer thereon is generally is checked as to if the compensator film is acceptable on not. The optical characteristics of the compensator film can be measured, for example, by a device that determines whether the orientation condition of anisotropic nematic layer is achieved. The check can be conducted by continuously measuring the optical characteristics of the compensator film.

Subsequently, an optional heat treatment can by applied 631 in order to stress relax the transparent support having the orientation layer and further promote adhesion.

To one skilled in the art, an optional protective film can be superposed on the transparent support having the orientation layer and the layer of liquid-crystal polymer compound using a laminator in such a manner that the protective film is in contact with anisotropic nematic layer to form a composite film, and the composite film is wound up in a wound roll 635 by a wind-up machine 633.

Figure 9:
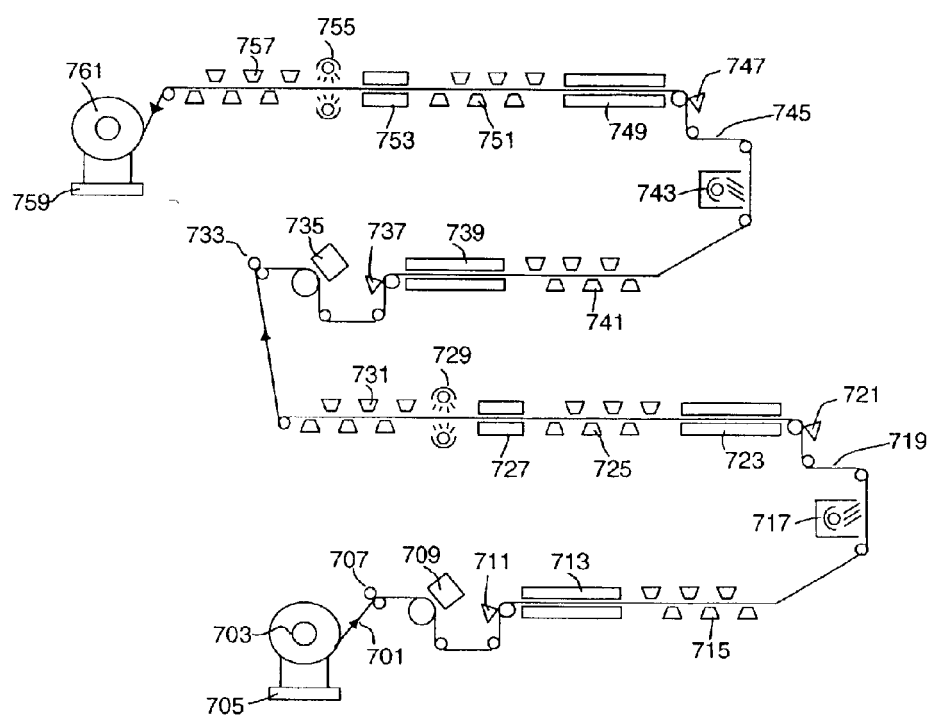
FIG. 9 shows another embodiment of a process for making a four-layer system comprising two orientation layers and two anisotropic liquid crystal layers.

FIG. 9 schematically shows another example of the process for the preparation of an optical compensator comprising two orientation layers and two anisotropic nematic liquid crystal layers. A continuous transparent support 701 is fed from a roll of the continuous support 703 using a delivery machine 705, and driven using a driving roller. In effect the steps of 701 to 731 can be performed in the same manner as the steps explained as above referring to FIG. 8, but then instead of going into a wind up machine 633, the transparent support with an oriented layer, and an anisotropic nematic layer thereon undergoes analogous formation of a second orientation layer and second anisotropic nematic liquid crystal before wind up on roller 761.

In detail, optionally dust on a surface of the support can be removed using a surface dust-removing machine 707. A web treatment (Corona discharge, glow discharge, particle transfer roll etc.) can be performed by apparatus 709. The continuous transparent support is moved using a driving roller toward a coating machine 711. A coating liquid of a resin for forming an orientation layer in a solvent is coated using a coater 711 on the surface of the support. The coater can be a slide, slot, gravure, roll coater, etc. The coated layer is then dried in a drying zone 713 to form a transparent resin orientable layer on the support. Drying can be accomplished by IR, conduction, air convection, microwave, etc. Heat treatment by means of heaters 715 can also used and accomplished by IR, conduction, air convection, etc. The transparent support having the orientable resin layer is then subjected to UVB light using a polarized UVB light source 717 to form an orientation layer. An optional heat treatment 719 can be employed to reduce stress and remove remaining residual solvents in the orientation layer.

The continuous transparent support having the orientation layer is moved using a driving roller toward a coating machine 721. A coating liquid of a liquid-crystal compound having liquid crystalline property in a solvent is coated on the orientation layer using the coating machine 721 to form a coated layer. Subsequently, the solvent in the coated layer is vaporized in a dryer 723, and the coated layer is heated in a heating section 725 to form to promote adhesion of the anisotropic nematic liquid crystal layer to the orientation layer. Again the heating and drying means can utilized IR, conduction, and/or air convection, etc.

The coated liquid-crystal polymer compound on top of the oriented resin layer is then cooled in a cooling zone 727 to form a nematic phase, preferably a positive birefringence nematic phase.

The layer of LC compound is then exposed to ultraviolet light (UV light) emitted by UV lamp 729, which can be a non-polarized flood light, to form a cured layer. Subsequently, an optional heat treatment can by applied 731 to the transparent support having the orientation layer and the nematic compound layer in order to stress relax and further promote adhesion.

The second orientation layer and second anisotropic nematic liquid crystal layers are then applied. The transparent support having the orientation layer and the nematic compound layer thereon can have optionally have dust removed from the surface of the film using a surface dust-removing machine 733. A web treatment (Corona discharge, glow discharge, particle transfer roll etc.) can be performed by apparatus 735. The continuous transparent support is moved using a driving roller toward a coating machine. A coating liquid of a pre-polymer or resin for forming a second orientation layer in a solvent is coated using a coater 737 on the surface of the film. The coater can be a slide, slot, gravure, roll coater, etc. The coated layer is then dried in a drying zone 739 to form a second orientable resin layer on the film. Drying can be accomplished by IR, conduction, air convection, microwave, etc. Optionally, heat treatment by means of heaters 741 can is used and accomplished by IR, conduction, air convection, etc. The transparent support having the second orientable resin layer is then subjected to UVB light using a polarized UVB light source 743 to form a second orientation layer. The polarized UVB light source 743 is arranged such that the optic axis of the second orientation layer is positioned orthogonally relative to the respective optic axis of the first orientation layer about an axis perpendicular to the plane of the substrate. Even though the optic axis of the first anisotropic layer 30 is preferred to be orthogonal (or ±90 degrees) relative to the respective (or counterpart) optic axis of the second anisotropic layer 50 about an axis perpendicular to the plane of the substrate, it should be understood that the angle between the optic axis of the two anisotropic layers can be in a range of 85 to 95 degrees to be considered as orthogonal.

An optional heat treatment 745 can be employed to reduce stress and remove remaining residual solvents in the second orientation layer.

The continuous transparent support having the two orientation layers and the first anisotropic nematic layer is moved using a driving roller toward a coating machine 747. A coating liquid of a liquid crystal compound having liquid crystalline property in a solvent is coated on the orientation layer using the coating machine 747 to form a coated layer. Subsequently, the solvent in the coated layer is vaporized in a dryer 749, and the coated layer is heated in a heating section 751 to form to promote adhesion of the anisotropic nematic liquid crystal layer to the orientation layer. Again the heating and drying means can utilize IR, conduction, and/or air convection.

The second anisotropic nematic layer is then cooled in a cooling zone 753 to form a second layer with a positive birefringence nematic phase.

The second anisotropic nematic layer is then exposed to ultraviolet light (UV light) emitted by UV lamp 755, which can be a non-polarized flood light, to form a cured layer. Subsequently, an optional heat treatment can by applied 757 to the compensator film formed above in order to stress relax and further promote adhesion.

The liquid coatings in the described process steps can be applied using slide coating, slot coating, gravure coating, roll coating, etc. as described in *Liquid Film Coating*, ed. Kistler and Schweizer, Chapman and Hall, 1997.

To one skilled in the art, an optional protective film can be superposed on the optical compensator film formed above using a laminator in such a manner that the protective film is in contact with the second anisotropic nematic layer to form a composite compensator film, and the composite film is wound up by a wind-up machine 759 to form a wound roll 761.

Figure 10:
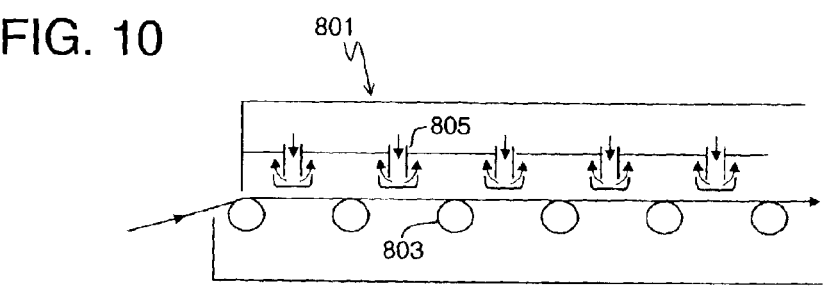
FIG. 10 shows one embodiment of a drying unit that can be used in the process of FIGS. 7 through 9.

The step of drying the anisotropic nematic layer is now explained in more detail. FIG. 10 shows one embodiment of the drying zone. On the orientation layer of the moving continuous transparent film, a coating liquid of a liquid crystal compound in a solvent is coated as described previously. The transparent film having the anisotropic nematic layer thereon is moved along a drying zone 801 containing therein rollers 803 for conduction of heat to the backside of the continuous support and diffusive air baffles 805 on the coated side of the support. The diffusive air baffles 805 preferably deliver a gaseous layer to dilute vaporized solvent. In another embodiment, a gaseous layer is moved along the coated surface at small relative rates to the movement rate of the coated layer as described by Suga et al.

In the drying zone 801, the temperature generally is in the range of room temperature to 150° C., preferably 20° C. to 100° C. The running rate of the support generally is in the range of 5 to 150 m/min. (preferably in the range of 15 to 120 m/min.). The length of the drying zone generally is in the range of 0.5 to 60 m.

Figure 11:
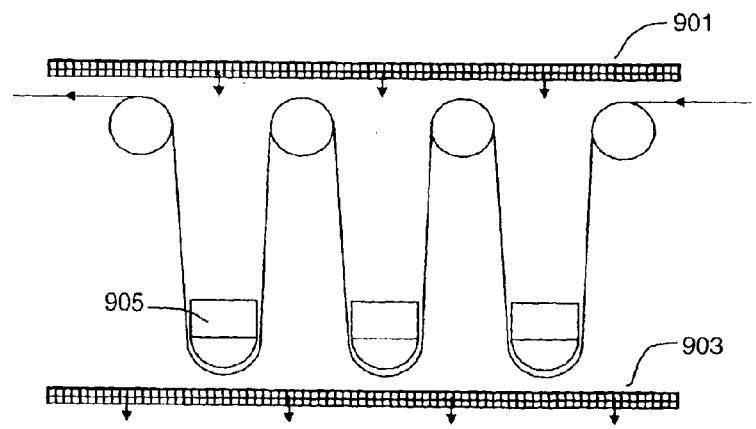
FIG. 11 shows one embodiment of a heating unit that can be used in the process of FIGS. 7 through 9.

In FIG. 11, the transparent film having the anisotropic nematic thereon layer subjected to the drying treatment is subsequently heated in a heating zone. When the heated air is blown on one side, it is preferred to blow the heated air on the side having no coated layer. The heated air is generally set to have a temperature of 30° to 300° C. FIG. 11 shows one embodiment of a heating zone where heated gas is blown from the top side of the zone through a perforated diffusing plate 901. Heated gas moves through the section and exhausts through the perforated floor of the zone 903. The continuous web moves through the section via driven rollers and air reversing bars 905.

Figure 12:
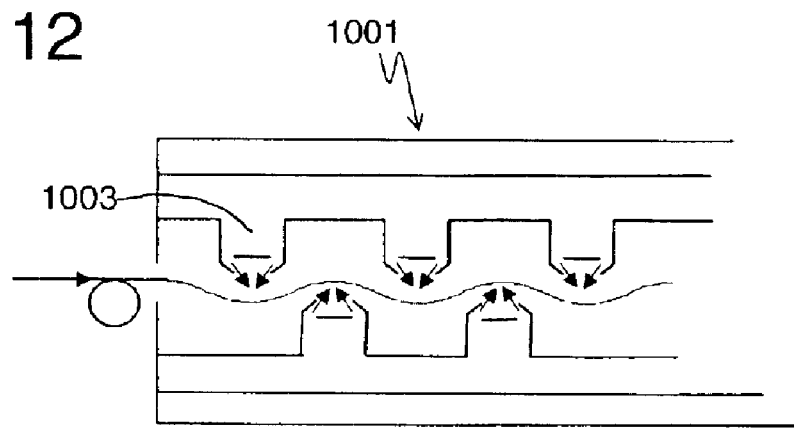
FIG. 12 shows one embodiment of a cooling unit that can be used in the process of FIGS. 7 through 9.

Examples of means for heating other than heated air include application of infrared rays and interaction of heated rolls. The heated anisotropic nematic layer can be cooled in a cooling zone 1001 depicted in FIG. 12 to form the nematic phase of the liquid crystal compound having liquid crystalline property. In one embodiment of the cooling zone, gas bar distributors 1003 are positioned on both sides of the continuous support containing the functional layers and cooling gas is blown against the film. In a preferred embodiment, the average cooling rates are advantageously within the range of from 0.05° C./second to 5° C./second, preferably 0.10° C./second to 3° C./second. The anisotropic nematic layer is then held near or below its nematic-isotropic phase transition temperature (Tc) for at least 5 seconds, preferably 5 seconds to 30 minutes, until the anisotropic layer completely forms the desired nematic phase, preferably a positive birefringence nematic phase.

In an alternate embodiment, the cooling action can also be achieved by bringing the film into contact with cooled rollers.

In the case that a polymerizable or crosslinkable anisotropic nematic compound is used, the obtained layer of said anisotropic nematic compound is continuously subjected to light (preferably UV light) irradiation treatment. The ultraviolet-light irradiation device is provided in the vicinity of the cooling zone, whereby the layer of liquid-crystal compound is exposed to UV light to be cured. Subsequently, the transparent support having the orientation layer and the cured anisotropic nematic layer is wound up, or optionally laminated with a protective film and then wound up.

The ultraviolet-light irradiation device typically has an ultraviolet lamp and a transparent plate, which UV light is passed through and shields heat rays and wind. An air for cooling is given around the ultraviolet lamp using an air fan for cooling a lamp.

Otherwise, the light irradiation treatment can be performed by moving the transparent support having the anisotropic nematic layer to an ultraviolet-light irradiation device (generally having a permeable sheet to UV light mainly shielding cooled air) disposed over a roller, and passing through the ultraviolet-light irradiation device such that the film is supported around a roller whereby the anisotropic nematic layer is exposed to UV light to be cured. Subsequently, the transparent support having the orientation layer and the cured anisotropic nematic layer is wound up, or laminated with a protective film and then wound up.

By the process for the preparation of an optical compensator described above, a continuous optical compensator film having the layer of liquid-crystal polymer compound can be efficiently prepared. Therefore, the process of the invention is suitable for a process for industrial preparation of the sheet or for mass production of the sheet.

The anisotropic nematic layer having a positive birefringence nematic phase is formed on the orientation layer. The layer of nematic compound is obtained by orienting the coated layer of nematic compound and cooling, or by orienting the coated layer of nematic compound having polymerizable group and curing, and the layer of nematic compound has a positive birefringence.

The anisotropic nematic layer can be prepared by coating a solution of the nematic compound (and other compounds if desired) in a solvent on the orientation layer, drying, heating, cooling to the temperature for forming a nematic phase and, polymerizing the coated layer (e.g., by radiation of UV light). The transition temperature of the nematic phase to the isotropic phase, Tc, generally is in the range of 40° C. to 300° C., preferably in the range of 40° C. to 70° C.

The entire contents of the patents and other publications referred to in this specification are incorporated herein by reference. The present invention is illustrated in more detail by the following non-limiting examples.

EXAMPLE 1

Experimentation was performed to investigate the effect of heat treatments on the contrast ratio (bright vs. dark state) of the described coated layers. Heat treatment refers, in these cases, to the post-drying steps of the process described in FIGS. 7 through 9.

To prepare samples, first a triacetyl cellulose support was coated with a subbing solution of the following composition:
70.16% acetone
27.17% methanol
1.31% water
0.15% isopropanol
0.35% cellulose nitrate
0.71% gelatin
0.14% salicylic acid
This solution was applied to the TAC support at a wet coverage of 18.3 g/m$^2$ and dried. To this was applied a layer of gelatin at 2.2 g/m$^2$ dry coverage.

On top of the gelatin coated TAC a photo-alignable orientation layer was coated from the following solution at a wet coverage of 16.5 g/m$^2$:

23.30% Staralign® 2110MEK (2% active, polyvinyl cinnamate polymer), commercially available from Vantico 13.95% methyl ethyl ketone
22.75% cyclohexanone
40.00% n-propyl acetate After drying to remove solvents, the sample was exposed to linearly polarized UVB light at a 20 degree angle. Upon this package of layers, a solution of a diacrylate nematic liquid crystal with photoinitiator (Irgacure® 369 photoinitiator from Ciba) was coated at a wet coverage of 9.33 g/m$^2$ and dried to form the anisotropic nematic liquid crystal layer. After drying, samples were heated for various times and temperatures. Samples were heated at temperatures ranging from 50° C. to 100° C. for times ranging from 30 seconds to 30 minutes. Samples kept at room temperature were used as comparisons.

All samples were then exposed to 400 mJ/cm$^2$ of UVA light to crosslink the anisotropic nematic liquid crystal layer. The base diacrylate nematic liquid crystal material coating solution is as follows:
29.00% LCP CB483MEK (30% active, prepolymer, supplied with photoinitiator) from Vantico
62.00% Toluene
9.00% ethyl acetate Each sample was then tested for adhesive strength using a cross-hatched tape test. This test is performed by scribing small hatch marks in the coating with a razor blade, placing a piece of high tack tape over the scribed area and then quickly pulling the tape from the surface. The amount of the scribed area removed is a measure of the adhesion. Adhesion strength was rated on a scale of 1 to 5. A rating of 1 corresponded to very poor adhesion and a rating of 5 corresponded to excellent adhesion.

All experimental data is summarized in Table 1, which contains the rating for samples heat treated at the temperatures and times described above.

TABLE 1

| Sample Number | Temperature (° C.) | Time (minutes) | Rating |
|---|---|---|---|
| 1 | 50 | 0 | 1 |
| 2 | 50 | 30 | 4 |
| 3 | 60 | 0 | 1 |
| 4 | 60 | 30 | 4 |
| 5 | 70 | 0 | 1 |
| 6 | 70 | 30 | 5 |
| 7 | 80 | 0 | 1 |
| 8 | 80 | 2 | 1 |
| 9 | 80 | 5 | 1 |
| 10 | 80 | 10 | 3 |
| 11 | 80 | 20 | 3 |
| 12 | 80 | 30 | 5 |
| 13 | 100 | 0 | 1 |
| 14 | 100 | 5 | 4 |
| 15 | 100 | 15 | 5 |
| 16 | 100 | 30 | 5 |
| 17 | 120 | 0 | 1 |
| 18 | 120 | 5 | 5 |
| 19 | 120 | 15 | 4 |
| 20 | 120 | 30 | 5 |

The data in Table 1 illustrate the utility of the invention in that the inclusion of a heat treatment improved the coated layer adhesion as compared to samples that received no post-drying heat treatment.

EXAMPLE 2

A thin film package was prepared in the same manner as discussed in Example 1. A series of samples prepared with the anisotropic nematic liquid crystal solution described in Example 1 were coated, dried, and then heat treated at 80° C. for 3 minutes. Samples were then cooled to near the nematic-isotropic phase transition temperature (Tc). The Tc of the anisotropic LC material was determined to be 55° C. using differential scanning calorimetry. As such, samples were cooled to 55° C. at different rates and then held at 55° C. for specified times. After cooling, samples were then cured with UVA light as described in Example 1 and tested. Each sample was viewed between crossed polarizing filters to determine the intensity levels of the bright and dark states produced by the aligned liquid crystal molecules. Intensity levels were recorded with a digital camera and contrast ratios were calculated by dividing the bright state intensity measurement by the dark state intensity measurement.

All experimental data is summarized in Table 2, which contains descriptions of the conditions under which samples were cooled to 55° C. and then held at 55° C. as well as contrast ratios (bright state intensity divided by dark state intensity) for all samples.

TABLE 2

| Sample Number | Cooling Rate (° C./second) | Time at 55° C. (seconds) | Contrast Ratio |
|---|---|---|---|
| 1 | No cooling | 0 | 3.00 |
| 2 | 2.5 | 30 | 3.11 |
| 3 | 2.5 | 80 | 1.68 |
| 4 | 2.5 | 200 | 6.51 |
| 5 | 0.75 | 15 | 2.18 |
| 6 | 0.75 | 30 | 6.73 |
| 7 | 0.75 | 100 | 6.18 |

The data in Table 2 illustrate that contrast performance is dependent not only on the manner in which samples are cooled, but also on length of time at which the samples are held near Tc of the anisotropic nematic liquid crystal.

Judicious selection of both the cooling rates and the hold times near Tc, are necessary to obtain optimal performance.

The entire contents of the patents and other publications referred to in this specification are incorporated herein by reference.

PARTS LIST

| | |
|---|---|
| 5 | compensator according to the present invention |
| 6 | compensator according to the present invention |
| 7 | compensator according to the present invention |
| 10 | substrate |
| 20 | orientation layer |
| 30 | anisotropic layer |
| 40 | orientation layer |
| 50 | anisotropic layer |
| 78 | plane of substrate (or XY plane) |
| 80 | XYZ coordinate system |
| 84 | optic axis in the anisotropic layer 30 |
| 86 | optic axis in the anisotropic layer 50 |
| 90 | UV light |
| 92 | roll moving direction |
| 94 | alignment direction |
| 300 | compensator according to the present invention |
| 310 | moving substrate |
| 320 | orientation layer |
| 330 | anisotropic layer |
| 350 | compensator according to the present invention |
| 360 | component supply roll |
| 370 | component supply roll |
| 400 | formed roll of optical compensator |
| 410 | roll-to-roll laminator |
| 420A | component supply roll |
| 420B | component supply roll |
| 500 | polarizer |
| 501 | transparent support with orientation layer thereon |
| 503 | roll of transparent support with orientation layer thereon |
| 505 | delivery machine |
| 507 | dust-removing machine |
| 509 | web treatment device |
| 511 | coating machine |
| 513 | drying unit |
| 515 | heating unit |
| 517 | cooling unit |
| 519 | ultraviolet light station |
| 521 | optional heating unit |
| 523 | wind-up machine |
| 525 | roll of compensator film according to the present invention |
| 550 | polarizer |
| 600 | liquid crystal cell |
| 700 | liquid crystal display |
| 601 | transparent support |
| 603 | roll of transparent support |
| 605 | delivery machine |
| 607 | dust-removing device |
| 609 | web treatment device |
| 611 | coating machine |
| 613 | drying unit |
| 615 | optional heating unit |
| 617 | polarized ultraviolet light station |
| 619 | optional heating unit |
| 621 | coating machine |
| 623 | drying unit |
| 625 | heating unit |
| 627 | cooling unit |
| 629 | ultraviolet light station |
| 631 | optional heating unit |
| 633 | wind-up machine |
| 635 | roll of compensator according to the present invention |
| 701 | transparent support |
| 703 | roll of transparent support |
| 705 | delivery machine |
| 707 | dust-removing device |
| 709 | web treatment device |
| 711 | coating machine |
| 713 | drying unit |
| 715 | optional heating unit |
| 717 | polarized ultraviolet light station |

-continued

| | |
|---|---|
| 719 | optional heating unit |
| 721 | coating machine |
| 723 | drying unit |
| 725 | heating unit |
| 727 | cooling unit |
| 729 | ultraviolet light station |
| 731 | optional heating unit |
| 733 | dust-removing device |
| 735 | web treatment device |
| 737 | coating machine |
| 739 | drying unit |
| 741 | optional heating unit |
| 743 | polarized ultraviolet light station |
| 745 | optional heating unit |
| 747 | coating machine |
| 749 | drying unit |
| 751 | heating unit |
| 753 | cooling unit |
| 755 | ultraviolet light station |
| 757 | optional heating unit |
| 759 | wind-up machine |
| 761 | roll of compensator according to the present invention |
| 801 | drying unit |
| 803 | roller |
| 805 | air baffle |
| 901 | air diffusing plate |
| 903 | perforated floor of heating unit |
| 905 | air reversing bar |
| 1001 | cooling unit |
| 1003 | gas bar distributor |
| θ | tilt angle |
| φ | azimuthal angle |

What is claimed is:

1. A process for making an optical compensator, comprising the steps of:

a) applying a liquid comprising a nematic liquid-crystal compound in a solvent carrier onto the orientation layer on a transparent support to form a liquid-crystal-containing coating;

b) drying the liquid-crystal-containing coating, thereby forming a liquid-crystal-containing layer;

c) optionally heating the liquid-crystal-containing layer to a temperature that is above 50° C.;

d) cooling the liquid-crystal-containing layer to near or below its isotropic nematic phase transition temperature $T_c$ for at least 5 seconds to form a positively birefringent nematic phase, thereby forming an anisotropic nematic liquid-crystalline layer;

e) polymerizing and/or curing the anisotropic nematic liquid-crystalline layer with radiation at a temperature below the $T_c$ of the anisotropic nematic liquid-crystalline layer to form an integral component.

2. A process for making an optical compensator, comprising the steps of:

a) applying a liquid composition, comprising an orientable resin in a solvent, to form a resin-containing coating on a transparent support;

b) drying the resin-containing coating to obtain an orientable layer;

c) orienting the orientation layer in a predetermined direction;

d) applying a liquid comprising a nematic liquid-crystal compound in a solvent carrier onto the orientation layer to form a liquid-crystal-containing coating;

e) drying the liquid-crystal-containing coating, thereby forming a liquid-crystal-containing layer;

f) heating the liquid-crystal-containing layer to a temperature that is above 50° C.;

g) cooling the liquid-crystal-containing layer to near or below its isotropic nematic phase transition temperature $T_c$ for at least 5 seconds to form a positively birefringent nematic phase, thereby forming an anisotropic nematic liquid-crystalline layer;

h) polymerizing and/or curing the anisotropic nematic liquid-crystalline layer with radiation at a temperature below the $T_c$ of the anisotropic nematic liquid-crystalline layer to form an integral component.

3. The process of claim 2 comprising, after step b), heating the orientable layer to between 25° C. and 300° C.

4. The process of claim 3 wherein the orientable layer is heated to a temperature under 110° C.

5. The process of claim 3 wherein after said heating of the orientable layer, the temperature is reduced to below 80° C.

6. The process of claim 1 or 2 wherein the cooling step comprises cooling the-positively birefringent nematic liquid-crystal-containing layer at an average rate ranging from 0.05° C./second to 5° C./second.

7. The process of claim 1 wherein after step d), further cooling the liquid-crystal-containing layer in order that the temperature of the coated support will not rise above the transition temperature $T_c$ during subsequent exposure to UV radiation.

8. The process of claim 2, wherein step c) comprises orienting the orientation layer in a predetermined direction brushing or photo-alignment.

9. The process of claim 1 or 2 wherein the liquid comprising a nematic liquid crystal compound is a polymerizable and/or curable compound and the radiation is UV light.

10. The process of claim 1 or 2 wherein drying the liquid-crystal-containing coating comprises vaporizing solvent for a period of 30 seconds to 10 minutes to remove solvent until at least 50 percent of the solvent is removed.

11. The process of claim 10 wherein drying the liquid-crystal-containing coating comprises vaporizing solvent for a period of 30 seconds to 10 minutes with a heated gas to remove solvent until 80 to 99 percent of the solvent is removed.

12. The process of claim 1 or 2 wherein heating the liquid-crystal-containing layer comprises heating to a temperature above 80° C. for 30 seconds to 10 minutes.

13. The process of claim 1 wherein cooling the liquid-crystal-containing layer comprises cooling to near or below its transition temperature $T_c$ for 5 seconds to 30 minutes.

14. The process of claim 1 or 2 wherein the steps of the process are continuously performed.

15. The process of claim 14 further comprising winding up the transparent support having the orientation layer and the liquid-crystal-containing layer.

16. The process of claim 1 or 2 wherein drying and heating of the orientation layer and the anisotropic nematic liquid-crystal-containing layer occurs in a separate drying and heating unit.

17. The process of claim 16 wherein the drying unit for drying the orientation layer or the anisotropic nematic liquid-crystal-containing layer comprises air distributors to deliver air to both sides of the coated support as well as rollers and air bars.

18. The process of claim 16 wherein the heating unit for the orientation layer also comprises air distributors to deliver air to both sides of the coated support as well as backside rollers that provide energy to the support via conduction.

19. The process of claim 16 wherein the heating unit for the liquid-crystal-containing layer comprises air flotation devices within a housing to deliver high temperature air to both sides of the coated support.

20. The process of claim 2 further comprising repeating the above steps in series to form a plurality of orientation layers and a plurality of anisotropic positively birefringent nematic liquid-crystal-containing layers to form an integral component wherein the optical axis of each anisotropic positively birefringent nematic liquid-crystal-containing layer is positioned relative to the respective optical axis of the other anisotropic liquid-crystal-containing layers by some small angle about an axis perpendicular to the plane of the substrates.

21. The process of claim 2 further comprising repeating the above steps in series to form a second orientation layer and a second anisotropic nematic liquid-crystal-containing layer to form an integral component so that the optical axis of the first anisotropic layer is positioned orthogonally relative to the respective optic axis of the second anisotropic nematic liquid-crystal-containing layer about an axis perpendicular to the plane of the substrates.

22. The process of claim 20 or 21 wherein the coatings are all coated in series.

23. The process of claim 20 or 21 comprising repeating the steps of claim 1 to form a second integral component; and bonding together the first and second integral components so that the optical axis of the anisotropic nematic liquid-crystal-containing layer in one component is positioned orthogonally relative to the respective optic axis of the anisotropic nematic liquid-crystal-containing layer in the other about an axis perpendicular to the plane of the substrates.

24. The process of claim 1 or 2 wherein the orientation layer contains a photo-orientable material.

25. The process of claim 24 wherein the orientable material is a poly(vinyl cinnamate).

26. The process of claim 20 or 21 wherein the optical axis of each of the anisotropic positively birefringent nematic liquid-crystal-containing layers has a fixed azimuthal angle.

27. The process of claim 20 or 21 wherein the optical axis of each anisotropic positively birefringent nematic liquid-crystal-containing layer has a fixed tilt angle.

28. The process of claim 20 or 21 wherein the optic axis of each anisotropic positively birefringent nematic liquid-crystal-containing layer has a variable tilt angle.

29. The process of claim 20 or 21 wherein the optical axis of each of the anisotropic positively birefringent nematic liquid-crystal-containing layers has a variable tilt angle and a variable azimuthal angle.

30. The process of claim 1 or 2 wherein a slide hopper, slot hopper, rod gravure, and/or roll coating method is used to form each of said coatings.

31. A process for making an optical compensator, comprising the steps of:

a) applying a liquid composition, comprising an orientable resin in a solvent, to form a resin-containing coating on a transparent support;

b) drying the resin-containing coating to obtain an orientable layer;

c) orienting the orientation layer in a predetermined direction;

d) applying a liquid comprising a nematic liquid-crystal compound in a solvent carrier onto the orientation layer to form a liquid-crystal-containing coating;

e) drying the liquid-crystal-containing coating, thereby forming a positively birefringent nematic liquid-crystal-containing layer;

f) heating the liquid-crystal-containing layer to a temperature that is above 50° C.;

g) cooling the positively birefringent nematic liquid-crystal-containing layer to near or below its isotropic nematic phase transition temperature $T_c$ for at least 5 seconds to form the nematic phase, thereby forming an anisotropic nematic liquid-crystalline layer;

h) optionally cooling again in order that the temperature of the coated support temperature will not rise above the clearing point temperature during subsequent exposure to UV radiation;

i) polymerizing and/or curing the anisotropic nematic liquid-crystalline layer with UV radiation at a temperature below the $T_c$ of the anisotropic nematic liquid-crystalline layer to form an integral component;

j) heating the integral component to relax the anisotropic layer, wherein the integral component is heated between 30° C. and 300° C.

* * * * *